United States Patent
Slutzky et al.

(10) Patent No.: US 8,886,857 B2
(45) Date of Patent: *Nov. 11, 2014

(54) DATA CONSOLIDATION USING A COMMON PORTION ACCESSIBLE BY MULTIPLE DEVICES

(71) Applicant: DataCore Software Corporation, Fort Lauderdale, FL (US)

(72) Inventors: Jeffry Z. Slutzky, Lake Worth, FL (US); Roni J. Putra, Pompano Beach, FL (US); Ziya Aral, Pompano Beach, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,492

(22) Filed: Mar. 6, 2014

(65) Prior Publication Data

US 2014/0304468 A1    Oct. 9, 2014

Related U.S. Application Data

(63) Continuation of application No. 13/441,150, filed on Apr. 6, 2012, now Pat. No. 8,706,935.

(51) Int. Cl.
*G06F 13/12*    (2006.01)
*G06F 13/38*    (2006.01)
*G06F 12/08*    (2006.01)

(52) U.S. Cl.
CPC ...... *G06F 12/0866* (2013.01); *G06F 2212/224* (2013.01)
USPC .......................................... 710/65; 711/147

(58) Field of Classification Search
None
See application file for complete search history.

(56) References Cited

U.S. PATENT DOCUMENTS

| | | | |
|---|---|---|---|
| 2007/0027870 A1 | 2/2007 | Kim et al. | |
| 2007/0239943 A1* | 10/2007 | Dice et al. | 711/147 |
| 2008/0109093 A1 | 5/2008 | Maeda et al. | |
| 2010/0257523 A1 | 10/2010 | Frank et al. | |
| 2011/0296412 A1 | 12/2011 | Banga et al. | |
| 2012/0179874 A1* | 7/2012 | Chang et al. | 711/128 |
| 2012/0210066 A1 | 8/2012 | Joshi et al. | |
| 2012/0210068 A1 | 8/2012 | Joshi et al. | |
| 2012/0324039 A1* | 12/2012 | Hirana et al. | 709/215 |
| 2013/0145105 A1* | 6/2013 | Sawicki et al. | 711/147 |

OTHER PUBLICATIONS

Z. Aral, et al., "Benchmarking a Scalable and Highly Available Architecture Virtual Desktops," DataCore Software [online] Retrieved from the internet URL: <http://www.datacore.com/downloads/VDI_benchmark_paper.pdf>, Jan. 20, 2011.

Z. Aral, et al., "Benchmarking a Scalable and Highly Available Architecture for Virtual Desktops," DataCore Software [online] Retrieved from the internet URL: http://www.datacore.com/downloads/VDI_benchmark_paper.pdf, Jan. 20, 2011.

* cited by examiner

*Primary Examiner* — Elias Mamo
(74) *Attorney, Agent, or Firm* — Rader, Fishman & Grauer PLLC (57) ABSTRACT

Multiple devices are provided access to a common, single instance of data and may use it without consuming resources beyond what would be required if only one device were using that data in a traditional configuration. In order to retain the device-specific differences, they are kept separate, but their relationship to the common data is maintained. All of this is done in a fashion that allows a given device to perceive and use its data as though it was its own separately accessible data.

16 Claims, 8 Drawing Sheets

DATA CONSOLIDATION USING A COMMON PORTION ACCESSIBLE BY MULTIPLE DEVICES

CROSS-REFERENCE TO RELATED APPLICATIONS

This is a continuation application of application Ser. No. 13/441,150, filed Apr. 6, 2012, the entirety of which being incorporated herein by reference.

BACKGROUND OF THE INVENTION

The present invention relates to data consolidation and more specifically to data consolidation using a common portion that is accessible by multiple devices. At the same time, device-specific portions are maintained according to modifications to the common portion that are made by individual devices.

SUMMARY OF THE INVENTION

According to one example, the present invention provides data consolidation using a common portion that is accessible by multiple devices while maintaining device-specific portions according to modifications to the common portion that are respectively made by individual devices.

Multiple devices are provided access to a common, single instance of data and may use it without consuming resources beyond what would be required if only one device were using that data in a traditional configuration. In order to retain the device-specific differences, they are kept separate, but their relationship to the common data is maintained. All of this is done in a fashion that allows a given device to perceive and use its data (common with device-specific modifications) as though it was its own separately accessible data.

For example, in one embodiment a storage domain server presents storage to tens, hundreds or even thousands of devices. The common portion can be retained in a cache layer of the storage domain server a single time, rather than repeating the common portion for each device. The device-specific portions may be retained in cache as well, but their size will be relatively small as compared to the common data portion. This is efficient because it conserves cache resources. At the same time, it allows the devices to access their data in a cache-responsive fashion, rather than requiring them to page underlying physical storage resources (e.g., hard disks) for storage requests.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

INTRODUCTION

The present invention reduces the need for trading memory and storage capacity for bandwidth when managing multiple computing systems of identical or similar type by creating a single copy of data for the multiple computing systems. Notwithstanding this sharing, the single copy is perceived by any of the individual computing systems as though it controls and accesses its very own unique copy of data. Modifications of the data by the individual computing systems are managed as unique to each system.

In one example, the data is presentable to a given device as a definable discrete image such as a virtual disk. There, the given device accesses the virtual disk as its own unique storage, with the virtual disk representing the underlying common portion and device-specific portion.

Accordingly, one or more embodiments of the present invention provide data consolidation using a common portion that is accessible by multiple devices, while also maintaining updatable device-specific portions each representing modifications to the common portion made by individual devices. Multiple devices are provided access to a common, single instance of data and may use it without consuming resources beyond what would be required if only one device were using that data in a traditional configuration. In order to retain the device-specific differences, they are kept separate, but their relationship to the common data is maintained.

Operating systems, such as Windows OS, and business applications such MS Outlook and web browsing are some examples of data that does not change much from device to device. These cases are suitable examples wherein a single copy of the data may reside in cached memory to the benefit of multiple computing systems. The sets of changed data corresponding to the single copy of data would be potentially equal to the number of computing systems, but these changes would be relatively small and require less usage of storage resources. It should also be noted that the common portion does not need to represent all of the possible data in any given example. For example, with an OS, there may be a smaller "working set" portion of the OS that is configured as the common portion of data, rather than the entire OS.

For example, in one embodiment a storage domain server presents storage to tens, hundreds or even thousands of devices. The common portion can be retained in a cache layer of the storage domain server a single time, rather than repeating the common portion for each device. The device-specific portions may be retained in cache as well, but their size will be relatively small as compared to the common data portion. This is efficient because it conserves cache resources. At the same time, it allows the devices to access their data in a cache-responsive fashion, rather than requiring them to page underlying physical storage resources (e.g., hard disks).

Retaining State of Consolidated Data

One example of maintaining the relationship between the common data and the device-specific differences uses representations of the state of consolidated data. A given device perceives and accesses consolidated data that consists of the common data and a device-specific portion (i.e., the changes to the common data made by the given device). A representation of the state of the consolidated data maintains an association between the common data and the device-specific data.

In one example, the consolidated data may be presented as virtual disks. For any given device, a particular virtual disk may be presented. The particular virtual disk—the consolidated data—presents the common data and the device-specific data to the given device as one accessible unit. A representation of the state of the virtual disk maintains the relationship between the common data and the device-specific data. In one example, representation of the state of the virtual disk uses a snapshot of the virtual disk.

The person of ordinary skill in the art will readily recognize alternative implementations. Various alternative state-representations may be used in lieu of snapshots. Additionally, any copy-on-write scheme may be used to separately manage the common portion and device-specific portions.

Predetermined Common Data

According to another aspect, the common data may be predetermined, meaning that it is known common data that will be used by various devices in a system. This common data may be represented as a predetermined common data image, which may also be referred to as a golden image.

Normally, the predetermined common data would be deployed and separately represented for each user (i.e., in each of the numerous disks). In lieu of this, numerous devices such as application servers can access the single predetermined common data image. Examples of the predetermined common data include but are not limited to an OS, a boot sequence, and applications.

Virtual Machine Consolidation

According to another aspect, Virtual Machines are represented, with the common portion being a common Virtual Machine image. Thus, for example, a VM Image can be booted from the single common VM image.

These various aspects are described in further detail below.

Figure 1A:
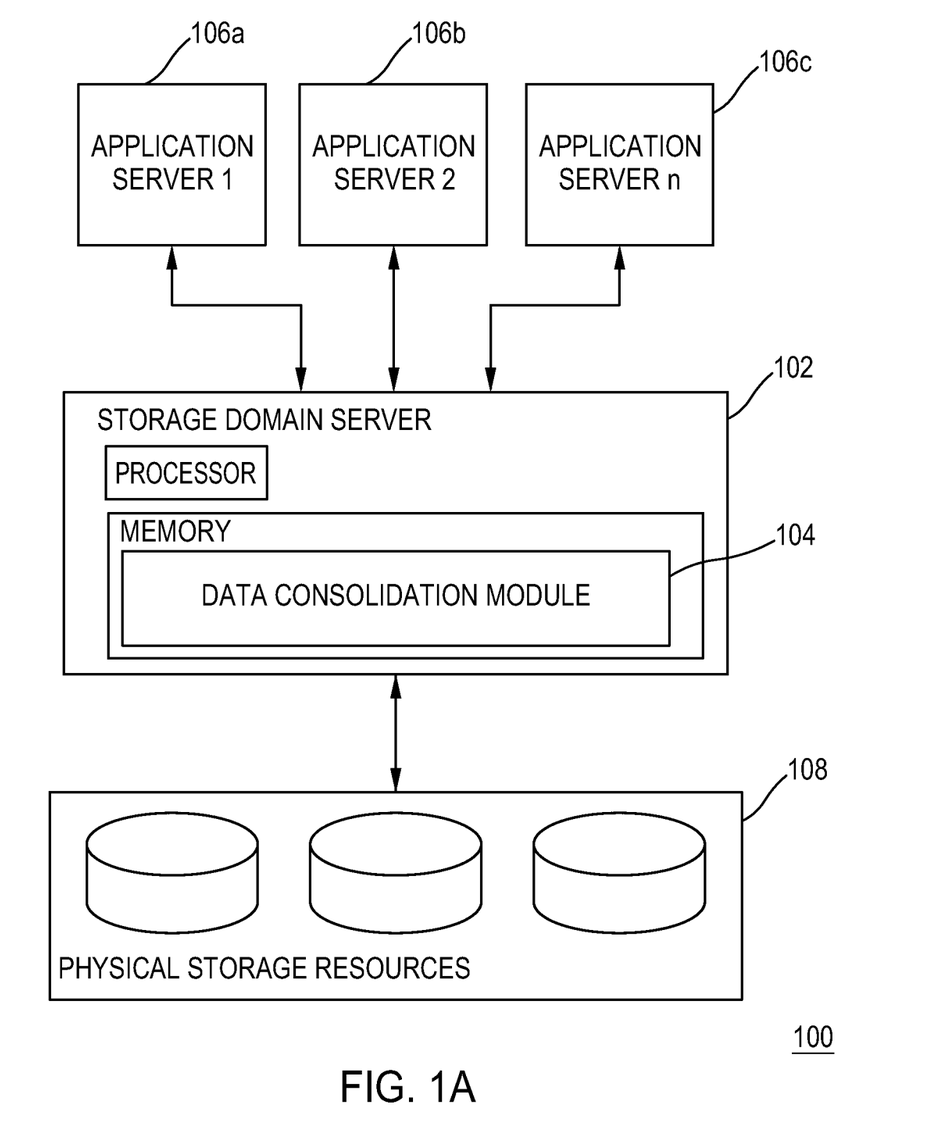
FIGS. 1A-B are block diagrams illustrating an example of a system implementing application data consolidation.

FIG. 1A is a block diagram illustrating an example of a system implementing application data consolidation. The system is a Storage Area Network 100 that includes a storage domain server 102 configured to include a data consolidation module 104. The storage domain server 102 presents virtual disks to the application servers 106*a-c*, provides corresponding virtualization, provisioning, mapping, caching, and related features, and implements physical storage resources 108 as necessary to satisfy storage requirements and demands.

Any conventional connections may be used between the SDS 102 and the application servers 106*a-b*, as well as to the physical storage resources 108. Additionally, any conventional computing platforms and processing resources may be used for the application servers 106*a-b*, as well as for the SDS 102. The SDS 102 also includes its own memory resources (e.g., RAM or flash memory) that may be used to perform caching operations that are further described herein.

The data consolidation module 104 contains instructions that are executed by the SDS 102 to carry out the application data consolidation functionality described herein. Specifically, in one embodiment the data consolidation module 104 provides data consolidation wherein an instance of a common portion of data is accessible by multiple devices. The data consolidation module maintains a relationship between the common data and device-specific portions of data that are respectively accessible by individual ones of the data devices. This provides access to the instance of the common portion of data by the data devices without requiring replication of the common portion of data, while also facilitating modifications to the common portion of data maintained by the respective device-specific portions.

The data consolidation module 104 is preferably provided as software, but may be alternatively provided as hardware, firmware, or any combination of hardware, firmware and/or software. Additionally, the program code for the data consolidation module 104 may be stored on a non-transitory computer readable medium (memory), including but not limited to a hard disk, an optical disk, a flash memory, or any computer readable memory in which the program code may be stored.

Figure 1B:
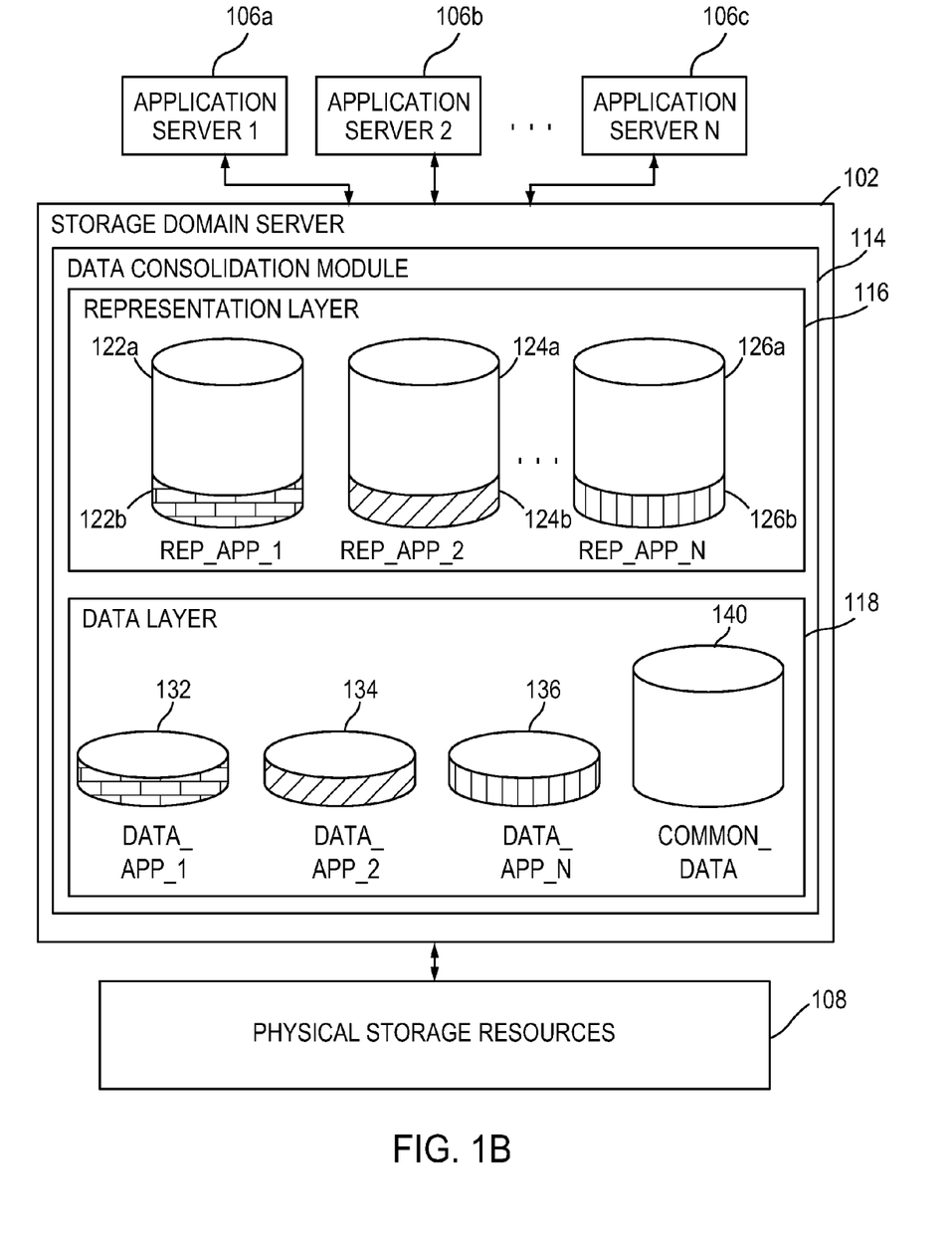

FIG. 1B is a block diagram further illustrating the data consolidation module 114. The storage domain server 102 similarly presents data to application servers 106*a-c* or other systems, and implements physical storage resources 108. It also similarly implements a processor and memory for carrying out the described functionality.

The data consolidation module 114 further includes a representation layer 116 and a data layer 118, which in certain embodiments may be a cache layer.

The storage domain server 102 may also be configured to include a virtualization layer for presenting virtual disks to the application servers, and for providing corresponding functions such as thin provisioning of storage resources as well as any necessary access, allocation and correlation to the physical storage resources. For example, the virtualization layer may present virtual disk "App_1" to Application Server1 and virtual disk "App_2" to Application Server2.

The representation layer 116 maintains representations associating device-specific (122*b*, 124*b*, 126*b*) and common data portions (122*a*, 124*a*, 126*a*) in the context of the virtual disks. For example, Rep_App_1 is a representation of a virtual disk App_1 presented to Application Server 1, and Rep_App_2 is a representation of a virtual disk App_2 presented to Application Server 2, and so on through Rep_App_N which corresponds to Application Server N. As noted, these servers may number in the 1000s or more.

Each of these representations maintains an association between the common data and device-specific portions. Rep_App_1 includes device-specific portion 122*b* and common data portion 122*a*, Rep_App_2 includes device-specific portion 124*b* and common portion 224*a*, and so on through Rep_App_N having common portion 126*a* and device-specific portion 126*b*.

Typically, the representation layer 116 does not store the data itself, but instead maintains representations of the data, such as metadata that organizes the data that is actually stored elsewhere.

The data layer 118 stores the data. Specifically, the data layer 118 stores the Common_Data 140, which is the common data referenced in the representations 122*a*, 124*a* and 126*a*. The Common_Data 140 is stored once but is used numerous times. The device-specific data 132, 134, 136 are also stored in the data layer 118. Thus, the data layer 118 stores only one instance of the Common_Data 140 and the relatively small amounts of device-specific data 132-136, denoted Data_App_1, Data_App_2 and Data_App_N.

The data layer 118 may be a cache layer, with corresponding physical storage resources 108 providing the underlying physical storage for the cache.

Although the device-specific portions Data_App_1 132, Data_App_2 (134) and Data_App_N (136) appear to be of similar size in the figure, it is noted that they will often have different sizes. For example, there may be an instance where one device (App_1) uses most or all of the Common_Data 140 without making any changes, whereas another device (e.g., App_2) makes a lot of changes to the Common_Data 140. In that situation, the device-specific portions for the two devices will differ in size. This being the case, one device may use less of the Common_Data 140 than another device. It is also noted that excessive modifications by one device would not defeat the overall efficiencies of the approach, as there may still be many devices still using the most or all of the Common_Data 140 in unchanged form.

Figure 2:
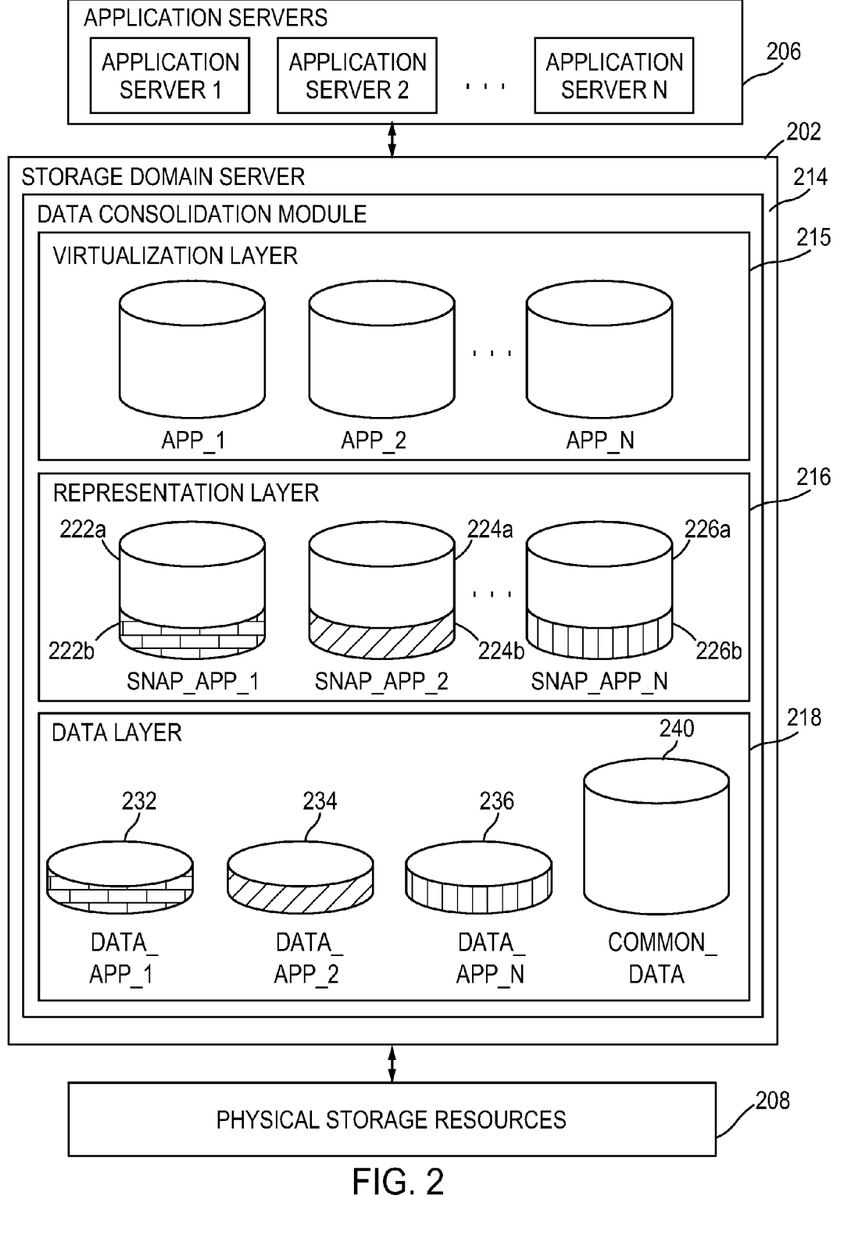
FIG. 2 is a block diagram illustrating another example of a system implementing application data consolidation.

FIG. 2 is a block diagram illustrating another example of an SDS 202 with a data consolidation module 214. The storage domain server 202 presents disks to the various application servers 206 and similarly implements various physical storage resources 208. It also similarly implements a processor and memory for carrying out the described functionality.

The storage domain server 202 includes a data consolidation module 214 with a virtualization layer 215, a representation layer 216 and a data layer 218 (e.g., a cache layer).

The virtualization layer 215 includes instructions for presenting virtual disks to the application servers, and for providing functions such as thin provisioning of storage resources as well as any necessary access, allocation and correlation to the physical storage resources. Additional features such as interfaces for defining and assigning storage pools, determining quality of service parameters, and other features of the SDS 202 may also be provided and need not be described herein.

The virtualization layer 215 presents a virtual disk "App_1" to Application Server 1, a virtual disk "App_2" to Application Server 2, and a virtual disk "App_N" to Application Server N.

The data consolidation module 214 generates and manages representations corresponding to the virtual disks (or other data) presented to the application servers 206.

Although any type of data representation of the state of the virtual disks may be implemented, in one example the representations are snapshots of the disks. Any number of snapshots may be created, including more than one for a given application server, but for ease of discussion Snap_App_1 is a snapshot of a virtual disk App_1 presented to Application Server 1, and Snap_App_2 is a snapshot presented to Application Server 2, and so on through Snap_App_N which corresponds to Application Server N.

A snapshot may also be referred to as a point-in-time volume as a snapshot entails creation of a point-in-time representation of the data in the presented disk. A copy-on-write snapshot scheme may, for example, be implemented. There, when the snapshot is created, metadata about where original data is stored is copied. It is not necessary to physically copy the data for the snapshot when it is created, so creating the snapshot can be done very quickly and efficiently.

For each snapshot, the representation layer 216 tracks changes following the snapshot's creation. When a write to a given chunk occurs, the original data for that chunk is copied from the source and saved in association with the snapshot before the original source data is overwritten. Reads of the source are directed to the source (or to a corresponding cache sitting above the source). Reads of the snapshot are directed either to the source (if the corresponding chunk has not changed), or to the copied chunks associated to the snapshot, if those chunks have changed.

It should be noted that "chunks" is a unit amount of storage that will typically be an integer number of blocks (i.e., 1 or more blocks). The size of the chunks may be made as desired, noting that a smaller size definition (e.g., one block) may produce the least waste (e.g., a write to a block causes just that one block to be moved to storage in association with the snapshot), but also produce the most instances of computational overhead for moving chunks around.

In examples where snapshots are used, they may also be updated to change the point-in-time to a current time, and migration schemes may be used to migrate blocks to the original source.

Figure 3:
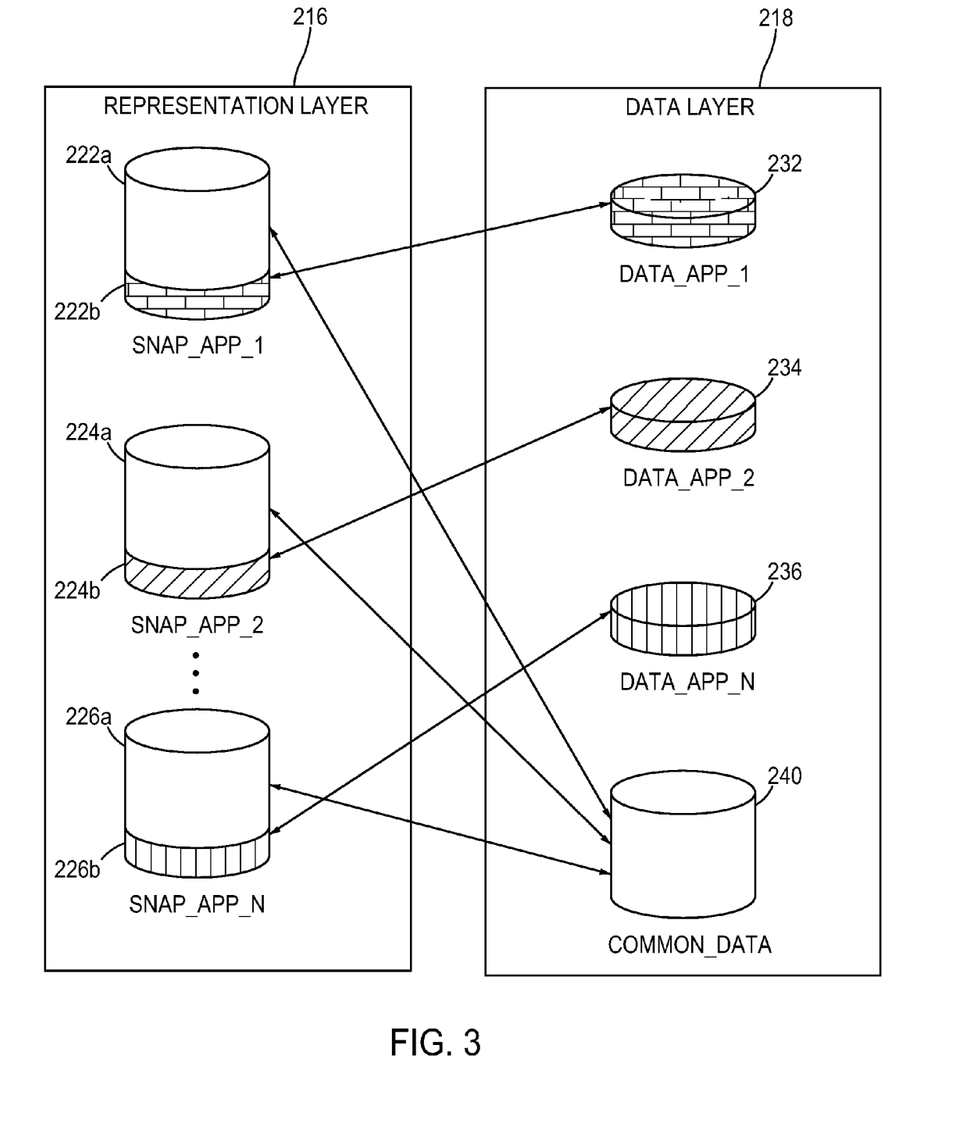
FIG. 3 is a schematic diagram further illustrating relationships between virtualized and consolidated data.

Referring to FIG. 3 along with FIG. 2, in the representation layer 216, each snapshot is shown as including a common data portion and a device-specific portion. For example, Snap_App_1 includes device-specific portion 222b and common data portion 222a, Snap_App_2 includes device-specific portion 224b and common data portion 224a, and so on through Snap_App_N having common data portion 226a and device-specific portion 226b.

When a snapshot is created, it may just include metadata because no changes have yet been made. When changes are made, they are tracked in the metadata as well, which allows reads and writes to be appropriately directed, such as to the original source or to the specific portion of the snapshot (e.g., if the snapshot is being read, and the read is to a block that has changed since the snapshot has taken, the read is to the specific portion corresponding to the snapshot, which is where the original source data is written). Thus, although the common data portion is repeatedly shown in the representation layer, it is not actually stored repeatedly.

In the data layer 218 there are device-specific caches 232, 234, 236 as well as a cache for the common data (Common_Data) 240.

The size of these caches may or may not be perfectly coincident with the corresponding storage in the physical storage resources 208. That is, for a relatively small cache size there may be more data in the physical storage than can be maintained in the cache. Additionally, in an initial instantiation of the consolidation technique, the snapshots are just metadata, and the cache may simply be reserved. As reads are performed, the used portion of the cache 240 can gradually build by pulling blocks up from the physical storage.

It should also be noted that the specific portions of each snapshot need not necessarily have a perfectly coincident storage in the cache as well. That is, the device-specific data 222b, 224b, 226b may be stored in memory other than the cache memory, or the device-specific data may be represented somewhat, but not entirely in the cache.

Figure 4:
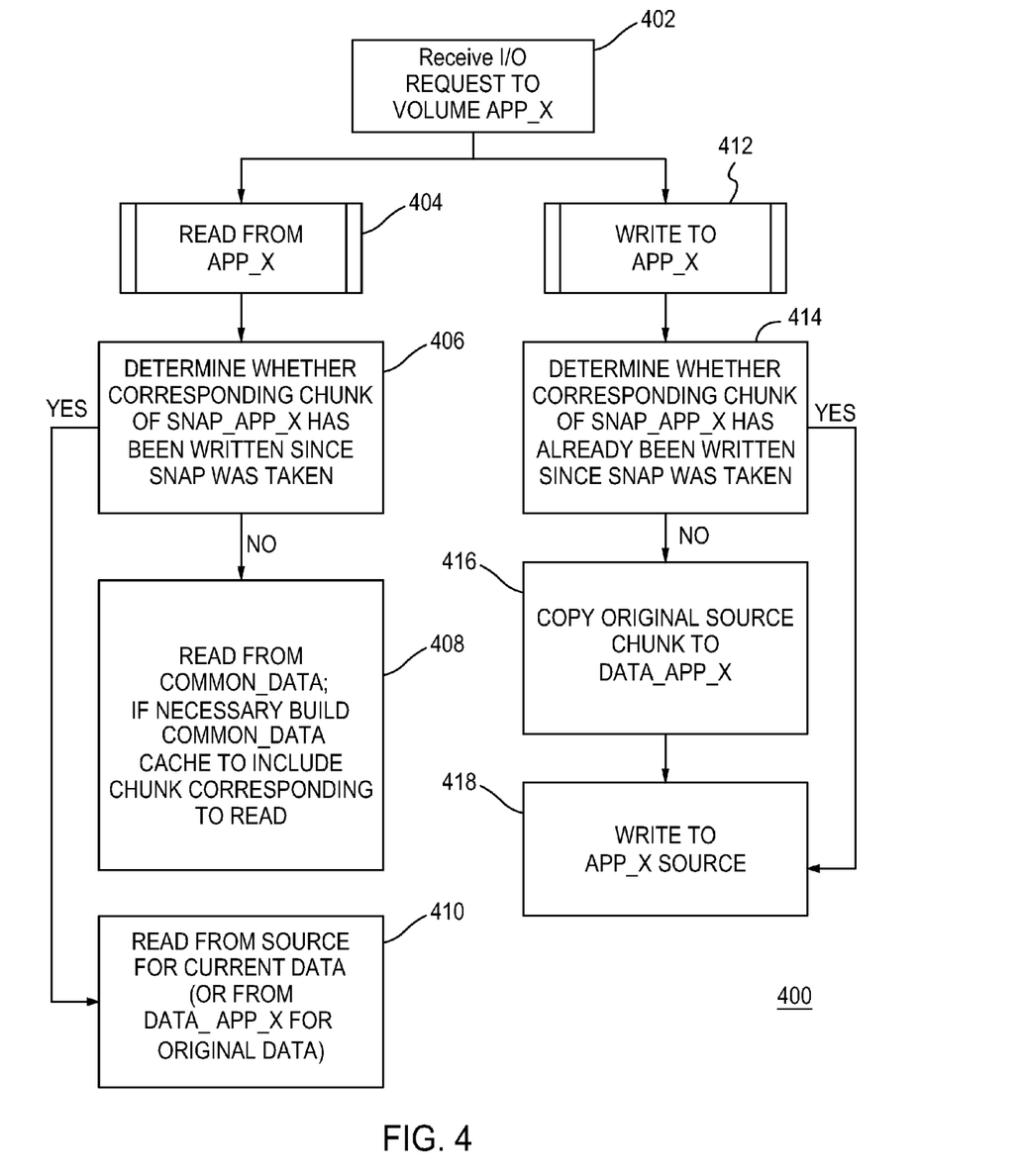
FIG. 4 is a flow diagram illustrating an example of a process for consolidating application data.

FIG. 4 is a flow diagram illustrating a process 400 for updating consolidated data representations in response to IO operations. As indicated, an IO request is received 402, which may correspond to any of the volumes presented by the SDS, generically referenced as volume App_x. As has been discussed, a snap shot has presumably been taken corresponding to this volume, with the snapshot denoted as Snap_App_x. Further, there is a device-specific data store Data_App_x and a common data store Common_Data for Snap_App_x and any number of other individual volumes.

The two branches of the flow diagram are for read (404) and write (412) operations.

For the read operation (404), it is determined (406) whether the chunk corresponding to the read has already been written since the snapshot Snap_App_x was taken. If it has, then a copy-on-write has already been performed, so to obtain the current state of the data, the source volume is simply read (alternatively, to access the original data, aka reading the snapshot, the read would be to the device-specific data retained in Data_App_x) (step 410).

If, on the other hand, it is determined (406) that the chunk corresponding to the read has not already been written since the snapshot was taken, then the read (408) may be made from the common data store (Common_Data). Where a cache of the common data is implemented, this read may be made directly from the cache, or the cache may be built if the chunk corresponding to the read is not yet resident in the cache. The cache Common_Data is thus automatically populated to contain the data that is hot for the various individual volumes.

For the write operation (412), it is determined (414) whether the corresponding chunk of Snap_App_x has already been written since the snap was taken. If so, then the original data has already been retained in the device-specific store, so the write can simply be made to App_x source (418). If not, then the original source chunk from the App_x source is initially copied (416) to the device-specific store Data_App_x, prior to writing (418) to the App_x source.

Figure 5:
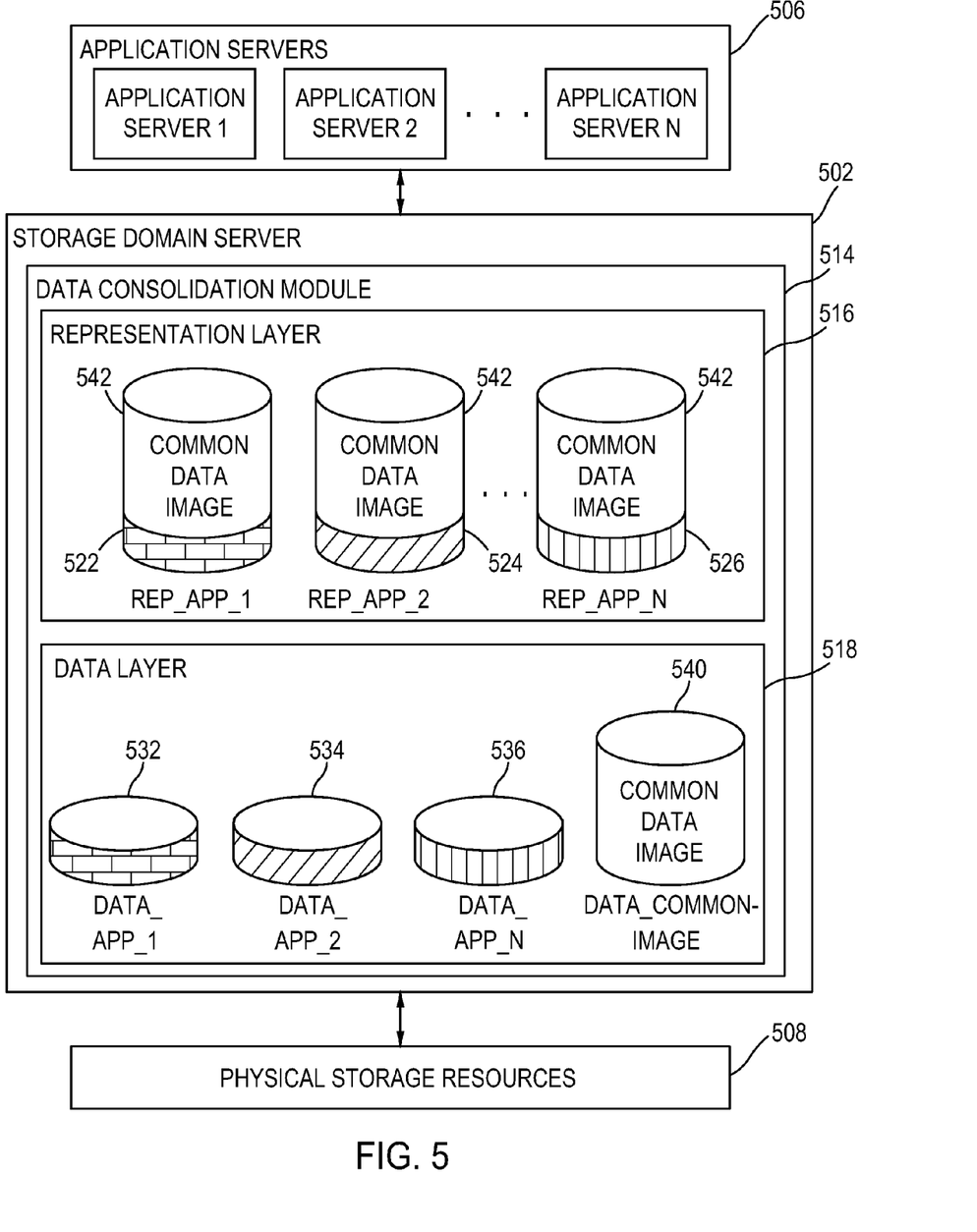
FIG. 5 is a block diagram illustrating an example of a system implementing application data consolidation for a predetermined common data image.

FIG. 5 illustrates another example of an SDS 502 including application data consolidation, in this instance a predetermined common data image being the consolidated data (540).

The SDS 502 similarly includes a virtualization layer (not shown in FIG. 5) as well as a data consolidation module 514, representation layer 516 and data layer 518.

Here, the virtualization layer again provides for virtual disk App_1 with respect to Application Server1 and virtual disk App_2 with respect to Application Server2.

The data consolidation module 514 implements the representation layer 516 to generate and maintain representations of the consolidated data, which may also be referred to as state-representations. For ease of discussion Rep_App_1 is a representation of a virtual disk App_1 presented to Application Server 1, and Rep_App_2 is a representation of a virtual disk App_2 presented to Application Server 2, and so on through Rep_App_N for virtual disk App_N, which corresponds to Application Server N.

In one example, the state-representations may be generated and maintained using snapshot technology. When the snapshots are created, metadata about where original data is stored is copied. It is not necessary to physically copy the data for the snapshot when it is created. Snapshots are not necessary though, and any state-representation may be used.

For each state-representation, the representation layer 516 tracks changes following the state-representation's creation. When a write to a given chunk occurs, the original data for that chunk is copied from the source and saved in association with the state-representation before the original source data is overwritten. Reads of the source are directed to the source (or to a corresponding cache sitting above the source). Reads of the state-representation are directed either to the source (if the corresponding chunk has not changed), or to the copied chunks associated to the state-representation, if those chunks have changed.

In the representation layer 516, each representation of the virtual disks respectively includes the common portion and a device-specific portion. However, in this instance the common portion 542 is a predetermined common data image. For example, Rep_App_1 includes device-specific portion 522 and the predetermined common data image portion 542, Rep_App_2 includes device-specific portion 524 and the predetermined common data image portion 542, and so on through Rep_App_N having the predetermined common data image 542 and device-specific portion 526.

In the data layer 518 (cache layer), there are device-specific caches 532, 534, 536 as well as a cache for the predetermined common data image 540.

In a fashion similar to the embodiment of FIG. 2, in this embodiment, at origination the state-representations include only the necessary metadata according to their initial definition. As writes are made to the corresponding volumes, the copy-on-write scheme is preferably used, wherein the source data is written to the device-specific portion prior to writing the data to the source. Similarly, reads are passed straight to the consolidated portion.

In contrast to the embodiment of FIG. 2, where the consolidated data Common_Data is populated as a result of reads, in this embodiment the predetermined common data image data Data_Common_Image 540 may preferably be fully populated in the cache in the first instance. This is because the predetermined common data image may be a known data element that will be used repeatedly for the various application servers in the enterprise. This embodiment offers both the economy of storing one instance of the predetermined common data image, while also preserving the flexibility of coherently defining and updating additional device-specific data for any given application server.

Figure 6:
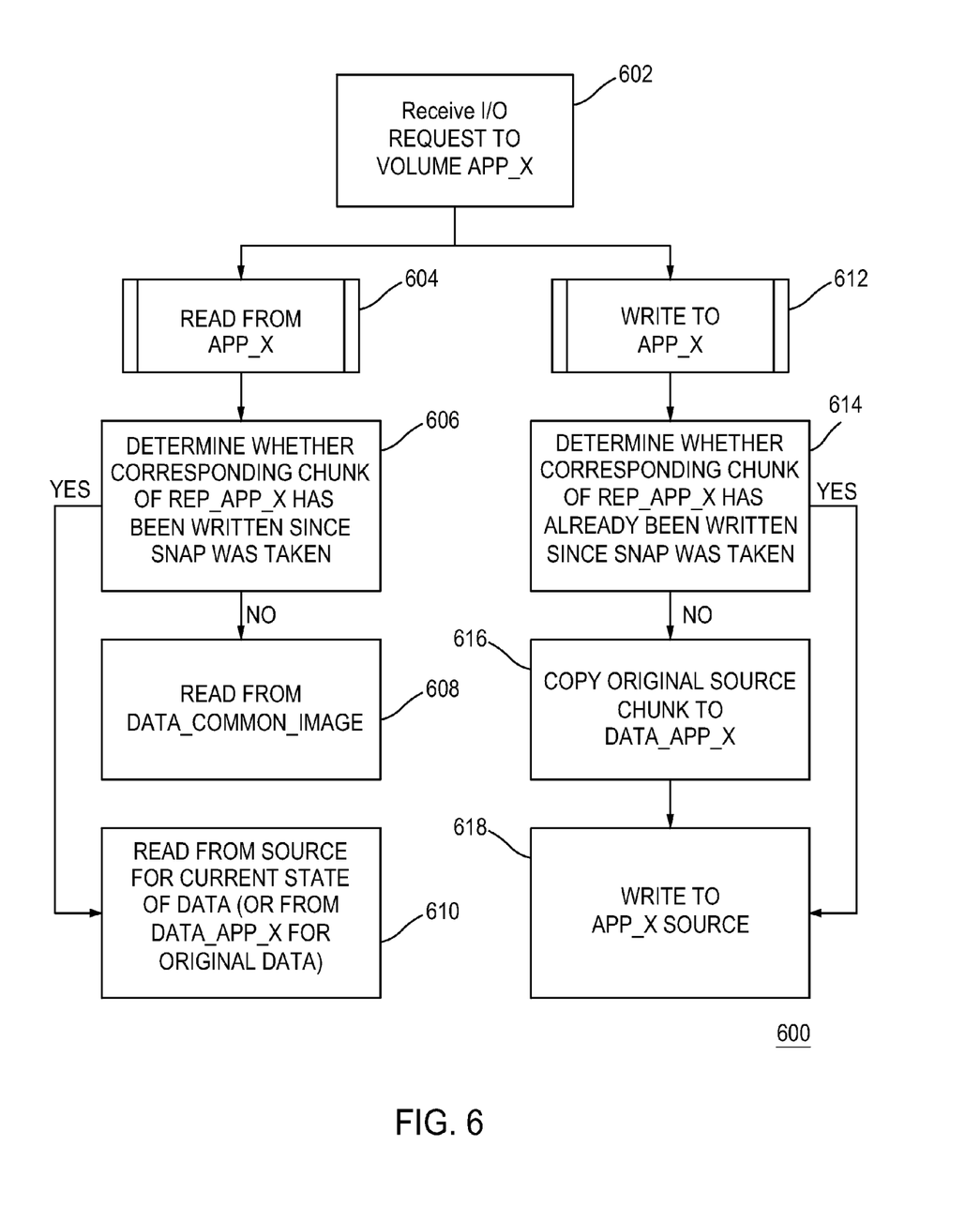
FIG. 6 is a flow diagram illustrating an example of a process for using consolidated predetermined common data image.

FIG. 6 is a flow diagram illustrating a process 600 for processing IO requests in an SDS configuration including a consolidated predetermined common data image and application server specific data.

An IO request is received 602 and may correspond to any of the volumes presented by the SDS, generically referenced as volume App_x. The representation Rep_App_x, and a corresponding device-specific data store Data_App_x, and the predetermined common data image data Data_Common_Image correspond to Application Server x.

The two branches of the flow diagram again correspond to the read (604) and write (612) operations.

For the read operation (604), it is determined (606) whether the chunk corresponding to the read has already been written since the representation Rep_App_x was instantiated. If it has, then a copy-on-write has already been performed, so to obtain the current state of the data, the source volume is read (610). Again, if it is desired to access the original data, which is reading the state-representation, the read would be to the device-specific data retained in Data_App_x. In this fashion, the predetermined common data image may be invoked as needed, with the associated additional application specific data being readily accessible as desired.

One example of a representation is a snapshot. In this example, to return to a previous state (i.e., when the snapshot was taken), both the predetermined common data image data (in Data_Common_Image) and all of the application-specific data are easily accessible using the snapshot. This allows both the predetermined common data image and additional, particular aspects of the application server to be retained in economical and readily-accessible fashion.

If, in response to the read, it is determined (606) that the chunk corresponding to the read has not already been written since the state-representation was taken, then the read (408) may be made from the predetermined common data image Data_Common_Image. Although, as noted, it is preferable to reside the predetermined common data image data in cache for fast access, there may be embodiments where it is not in cache in whole or in part, with the cache being populated as necessary.

For the write operation (612), it is determined (614) whether the corresponding chunk of Rep_App_x has already been written since the snap was taken. If so, then the original data has already been retained in the device-specific store, so the write can simply be made to App_x source (618). If not, then the original source chunk from the App_x source is initially copied (616) to the device-specific store Data_App_x, prior to writing (618) to the App_x source.

It is noted that as introduced above, the common and device-specific data portions may correspond to various examples of data including an operating system, applications, and/or application data of various types.

Figure 7:
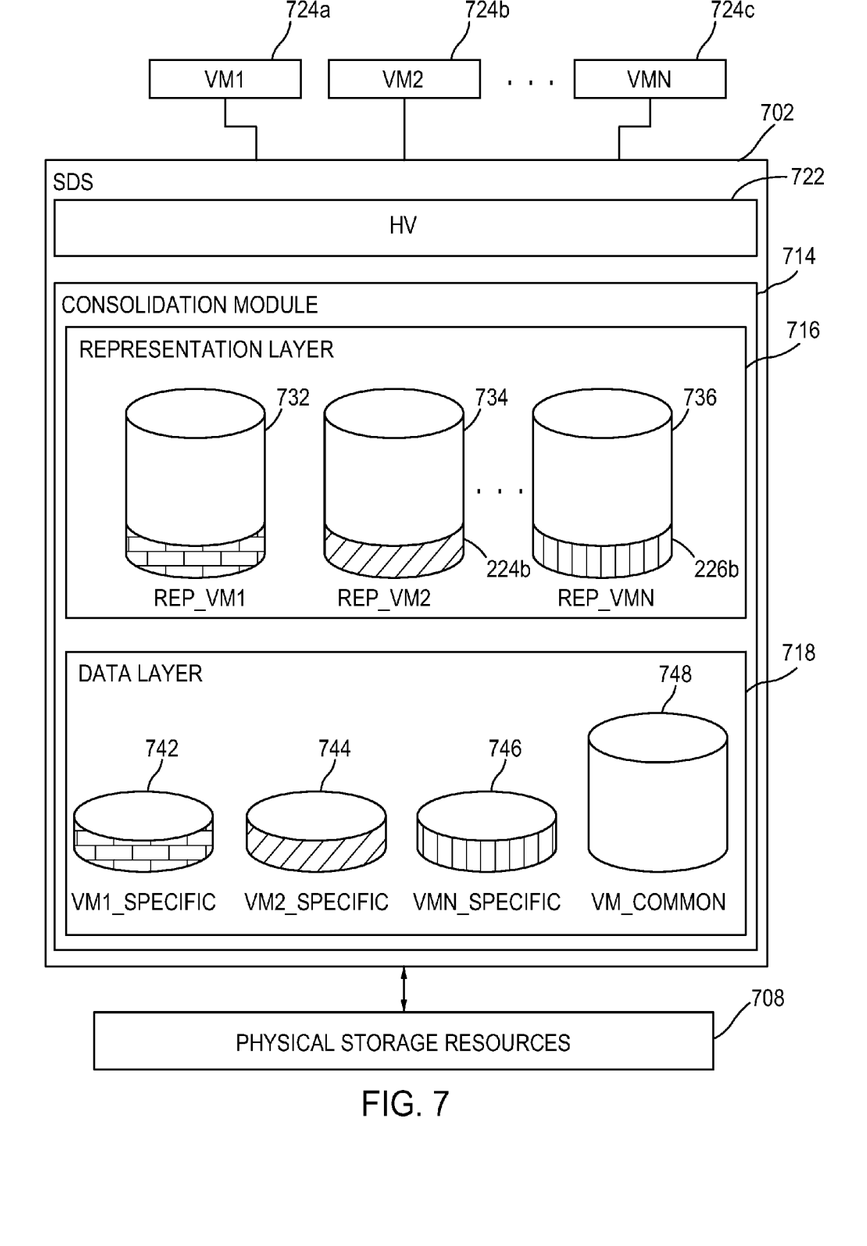
FIG. 7 is a block diagram illustrating an example of a system implementing consolidation of virtual machine images.

FIG. 7 illustrates an example of an SDS 702 that represents Virtual Machines and consolidates them to a common Virtual Machine image. This accommodates efficiencies such as the possibility of booting any VM that has been consolidated from the single common VM image.

The SDS 702 includes a consolidation module 714 with a representation layer 716 and a data layer 718, and similarly implements physical storage resources 708.

The SDS 702 further includes a Hypervisor (HV) module 722 that offers virtual machine management, allowing numerous Virtual Machines (e.g., VM1 724a, VM2 724b, etc., through VMn 724c) to run in the SDS environment. Each VM may be represented, such as Rep_VM1 732 and Rep_VM2 734 and Rep_VMn 736 as indicated. The representations indicate a common portion, which correlates to VM_Common 748 in the data layer, and device-specific portions, which respectively correlate to the machine-specific instances VM1_Specific 742, VM2_Specific 744 and VMn_Specific 746 in the data layer.

Similar to the above-described examples, the individual VMs share a common portion VM_Common, for which only one instance is required, with the additional device-specific aspects readily represented and associated to the common portion. In one embodiment, a representation of state such as a snapshot may be used to represent the common portion while also associating thereto the machine-specific aspects.

Thus embodiments of the present invention produce and provide for data consolidation. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for presenting virtual disks to devices, the method comprising:
   presenting the virtual disks to the devices;
   providing an instance of a common portion of data and device-specific portions of data that are accessible in response to transactions directed to the virtual disks by the devices,
   wherein the instance of the common portion of data is implemented as underlying data for each of the virtual disks, and
   the device-specific portions of data are respectively implemented as underlying data for modifications to the common portion of data for respective ones of the virtual disks; and
   maintaining respective caches for the common portion of data and the device-specific portions of data, such that the instance of the common portion of data is accessible for the transactions directed to any of the virtual disks without requiring replication of the common portion of data, while modifications to the common portion of data are respectively maintained for the device-specific portions of data.

2. The method of claim 1, further comprising:
   maintaining a common portion cache for the common portion of data;
   receiving read requests from the plurality of devices, directed to the plurality of virtual disks; and
   directing the read requests to the common portion cache.

3. The method of claim 2, further comprising:
   maintaining device-specific caches respectively corresponding to the plurality of device-specific portions;
   receiving a write request corresponding to a given virtual disk presented to a given device; and
   copying original source data corresponding the write request to a device-specific portion cache for the given virtual disk.

4. The method of claim 1, further comprising:
   maintaining a common portion cache for the common portion of data;
   receiving read requests from the plurality of devices, directed to the plurality of virtual disks; and
   directing the read requests to the common portion cache, and updating the common portion cache to include data read in the read requests following a cache miss, such that the common portion cache is populated with data.

5. The method of claim 1, wherein the common portion of data comprises an operating system.

6. The method of claim 1, wherein the common portion of data comprises application data.

7. A non-transitory computer readable medium storing program code for presenting virtual disks to devices, the program code being executable to perform operations comprising:
   presenting the virtual disks to the devices;
   providing an instance of a common portion of data and device-specific portions of data that are accessible in response to transactions directed to the virtual disks by the devices,
   wherein the instance of the common portion of data is implemented as underlying data for each of the virtual disks, and
   the device-specific portions of data are respectively implemented as underlying data for modifications to the common portion of data for respective ones of the virtual disks; and
   maintaining respective caches for the common portion of data and the device-specific portions of data, such that the instance of the common portion of data is accessible for the transactions directed to any of the virtual disks without requiring replication of the common portion of data, while modifications to the common portion of data are respectively maintained for the device-specific portions of data.

8. The computer readable medium of claim 7, wherein the operations further comprise:
   maintaining a common portion cache for the common portion of data;
   receiving read requests from the plurality of devices, directed to the plurality of virtual disks; and
   directing the read requests to the common portion cache.

9. The computer readable medium of claim 8, wherein the operations further comprise:
   maintaining device-specific caches respectively corresponding to the plurality of device-specific portions;
   receiving a write request corresponding to a given virtual disk presented to a given device; and copying original source data corresponding the write request to a device-specific portion cache for the given virtual disk.

10. The computer readable medium of claim 7, wherein the operations further comprise:
maintaining a common portion cache for the common portion of data;
receiving read requests from the plurality of devices, directed to the plurality of virtual disks; and
directing the read requests to the common portion cache, and updating the common portion cache to include data read in the read requests following a cache miss, such that the common portion cache is populated with data.

11. An apparatus for presenting virtual disks to devices, the apparatus comprising:
a processor; and
a memory, the memory storing program code executable by the processor to perform operations comprising:
presenting the virtual disks to the devices;
providing an instance of a common portion of data and device-specific portions of data that are accessible in response to transactions directed to the virtual disks by the devices,
wherein the instance of the common portion of data is implemented as underlying data for each of the virtual disks, and
the device-specific portions of data are respectively implemented as underlying data for modifications to the common portion of data for respective ones of the virtual disks; and
maintaining respective caches for the common portion of data and the device-specific portions of data, such that the instance of the common portion of data is accessible for the transactions directed to any of the virtual disks without requiring replication of the common portion of data, while modifications to the common portion of data are respectively maintained for the device-specific portions of data.

12. The apparatus of claim 11, wherein the operations further comprise:
maintaining a common portion cache for the common portion of data;
receiving read requests from the plurality of devices, directed to the plurality of virtual disks; and
directing the read requests to the common portion cache.

13. The apparatus of claim 12, wherein the operations further comprise:
maintaining device-specific caches respectively corresponding to the plurality of device-specific portions;
receiving a write request corresponding to a given virtual disk presented to a given device; and
copying original source data corresponding the write request to a device-specific portion cache for the given virtual disk.

14. The apparatus of claim 12, wherein the operations further comprise:
maintaining a common portion cache for the common portion of data;
receiving read requests from the plurality of devices, directed to the plurality of virtual disks; and
directing the read requests to the common portion cache, and updating the common portion cache to include data read in the read requests following a cache miss, such that the common portion cache is populated with data.

15. The apparatus of claim 12, wherein the common portion of data comprises an operating system.

16. The apparatus of claim 1, wherein the common portion of data comprises application data.

* * * * *